_United States Patent_ [19]

Fujii et al.

[11] 4,403,676

[45] Sep. 13, 1983

[54] TRANSMISSION WITH DIFFERENTIAL WITH LONGER POWER OUTPUT SHAFT SUPPORT CASING

[75] Inventors: Masao Fujii; Tetuo Hattori, both of Toyota, Japan

[73] Assignee: Toyoto Jidosha Kabushiki Kaisha, Toyota, Japan

[21] Appl. No.: 279,570

[22] Filed: Jul. 1, 1981

[30] Foreign Application Priority Data

Sep. 16, 1980 [JP] Japan .................................. 55-128172

[51] Int. Cl.³ .............................................. B60K 5/04
[52] U.S. Cl. .................................................. 180/297
[58] Field of Search ................. 180/297, 73.3; 74/701

[56] References Cited

U.S. PATENT DOCUMENTS 657,381  9/1900  Barnes .............................. 180/297
2,782,864  2/1957  Fessia ............................... 180/297

_Primary Examiner_—John A. Pekar
_Assistant Examiner_—D. Lynn Fugate

_Attorney, Agent, or Firm_—Stevens, Davis, Miller & Mosher

[57] ABSTRACT

A vehicle has two axially opposed driven wheels which are driven by two drive shafts of equal length, each flexibly drivingly coupled at its outer end to one of the wheels. A differential is located closer to a first one of the wheels and further from the other wheel. A short power output shaft extends from the differential towards the first wheel and is flexibly drivingly coupled at its outer end to the inner end of the drive shaft which drives that first wheel. A long power output shaft extends from the differential towards the other wheel and is flexibly coupled at its outer end to the inner end of the other one of the drive shafts, whose outer end is drivingly coupled to that other wheel. The long power output shaft passes through the inside space of a tubular housing, which is fixed at its inner end to the casing of the differential. A bearing is mounted in the outer end of the tubular housing and rotatably supports an outer part of the long power output shaft, and accordingly by the stiffness of the tubular housing the long power output shaft is firmly held in position.

12 Claims, 5 Drawing Figures

TRANSMISSION WITH DIFFERENTIAL WITH LONGER POWER OUTPUT SHAFT SUPPORT CASING

BACKGROUND OF THE INVENTION

The present invention relates to a power transmission device for a vehicle, and, more particularly, relates to a power transmission device for a vehicle with two axially opposed driven wheels, in which a differential is provided between these driven wheels and is axially located closer to one of these wheels and further from the other of them—i.e. in an asymmetrical location relative to the wheels.

In the case of a vehicle provided with a transversely mounted engine, especially in the case of a vehicle of the front engine front wheel drive type or the so called FF type, it is very common for the differential device which transmits power from the gearbox of the vehicle to the driven wheels thereof, and which provides differential action between said driven wheels, to be displaced to one side or to the other side of the longitudinal axis of the vehicle, i.e. for this differential device to be closer to one of the driven wheels and further from the other of the driven wheels. This is because of the limited space available in the engine compartment of such a vehicle, due to the transverse mounting of the engine therein, and to the relative alignment of the various units in the power train of the vehicle, and is a well known matter in the automotive art.

The question then arises as to how the rotary power is to be transmitted from such an asymmetrically positioned differential to these driven wheels of the vehicle. If the differential is provided with left and right power output shafts which are of the same length, and if the end of each of these power output shafts is connected to its respective driven wheel by a drive shaft and by universal joints, then, since the left and the right drive shafts will necessarily be of different lengths, these drive shafts will bend downwards at different angles, and will be connected to the driven wheels through different angles. This means that during acceleration of the driven wheels, and also, when the driven wheels are the front wheels of the vehicle and are also used for steering the vehicle, during turning round corners, then the difference in the torques provided to these driven wheels of the vehicle, when the steering geometry changes as it inevitably will in such circumstances, will cause asymmetrical acceleration and steering characteristics for the vehicle. For example, it may be the case that a tendency should arise for the vehicle, during acceleration, to steer towards the side on which the drive shaft is shorter. This deteriorates straight ahead drivability of the vehicle, and accordingly is quite unacceptable.

In view of the above described problem, a constructional solution has been proposed for a power transmission with such an asymmetrically located differential, in which the left and right drive shafts are of equal lengths, and bend downwards at the same angles, and on the side of the vehicle on which the distance between the differential and the driven wheel is the shorter the inner end of the drive shaft is directly connected to the outer end of the power output shaft of the differential by a universal joint, while on the side of the vehicle on which the distance between the differential and the driven wheel is the greater the inner end of the drive shaft is connected to the outer end of an intermediate shaft, the inner end of which is connected to the outer end of the power output shaft of the differential on that side. In this case, this intermediate shaft is supported, via bearings, by some fixed member of the vehicle.

In such a construction, the angles down through which the left and the right drive shafts incline are the same, and accordingly the left and right driven wheels are provided with equal steering torques, accordingly eliminating asymmetrical steering and driving characteristics of the vehicle; on the other hand, because the power output shaft of the differential on the side on which the differential is further from its driven wheel needs to be connected to the intermediate shaft via a third universal joint, in order to compensate for manufacturing tolerances in the alignment of the rotational axis provided for the intermediate shaft by the means for supporting the intermediate shaft, and the rotational axis of the power output shaft on that side of the differential, thereby the number of mechanical components is increased, and accordingly the cost of the power transmission is increased and the difficulty of manufacture thereof becomes higher. Further, the reliability of the transmission is decreased, and further problems arise such as an increase in weight, and an increase in the slack in the power train caused by the additional splined joints in the power train. Accordingly, such a solution, although it has been practiced, is by no means perfect.

Therefore, in order to cope with these problems, it has been proposed for no such intermediate shaft to be used, but instead for the power output shaft of the differential on the side where the differential is further from its driven wheel to be longer than the power output shaft of the differential on the side where the differential is closer to its driven wheel, so that on both sides the power output shafts of the differential are directly connected to their appropriate drive shafts by universal joints, both of these drive shafts being of the same lengths and angling downwards at the same angles. This solution is effective for minimizing the number of universal joints in the power train, and for ensuring that no asymmetrical steering characteristics or driving characteristics of the vehicle are caused. However, in order to provide sufficient rigidity for the support of the extended power output shaft of the differential on the side where the differential is further from its driven wheel, it is necessary for this long power output shaft to be rotatably supported near its outer end. In the past, this has been done by supporting the outer end of this long power output shaft by a bearing device which has been supported by a bracket mounted to the engine block of the vehicle. A problem has therefore arisen in this prior art, in that, since the central axis of the long power output shaft must be maintained as passing through the power output axis of the differential, in order to avoid rapid wear on the internal parts of the differential, a high dimensional accuracy has been required for the aforesaid bracket mounted to the engine block, and in practice during assembly of the power train of the vehicle an adjustment operation has been necessary. This has been troublesome and costly, and further has caused servicing problems for the vehicle during use, which have sometimes deteriorated the reliability of such a transmission. That is, if the transmission and/or the engine of such a vehicle require to be removed from the vehicle for major servicing, or for replacement or the like, then, when the vehicle is being reassembled, it is necessary to readjust the aforesaid bracket, in order to provide for proper alignment of the long power output shaft. This is difficult and troublesome, especially for a workplace or garage which is not very fully equipped; and of course, if this adjustment operation is not carried out, or is carried out improperly, then quick deterioration and eventual failure of the transmission will inevitably result, due to misalignment of the parts thereof.

SUMMARY OF THE INVENTION

Accordingly, it is an object of the present invention to provide a power transmission of a general construction such as described above, in which the differential is asymmetrically placed between the driven wheels of a vehicle to which the transmission is mounted, and in which the power output shafts of the differential are of unequal lengths, and are directly connected to drive shafts of equal length which drive the driven wheels of the vehicle and which angle downwards through the same angles, in which the longer power output shaft of the differential is braced by a simple and rigid construction.

It is a further object of the present invention to provide such a transmission as described above, in which no undue number of universal joints need be used.

It is a further object of the present invention to provide such a transmission as described above, in which the slack in the power train is minimized.

It is a further object of the present invention to provide such a transmission as described above, in which the weight is kept as low as possible.

It is a further object of the present invention to provide such a transmission as described above, in which no adjustment during assembly of the transmission is required.

It is a further object of the present invention to provide such a transmission as described above, in which manufacturing complexity is not significantly increased.

It is a yet further object of the present invention to provide such a transmission as described above, in which no unreasonably high dimensional accuracy is required for the various parts thereof during manufacture.

It is a yet further object of the present invention to provide such a transmission as described above, in which a good oil seal is provided for the transmission, and in which, when the vehicle is driven around a left or a right hand corner, surging of the lubricant oil within the differential thereof to one side or to the other side does not cause displacement of this oil to such a degree as to unduly deteriorate the lubrication of the various parts.

It is a yet further object of the present invention to provide such a transmission as described above, comprising an extension housing for bracing the longer power output shaft of the differential, in which, when said extension housing is removed from the differential together with said long power output shaft, the oil seal of the transmission is removed along therewith, and is not disturbed.

It is a yet further object of the present invention to provide such a transmission as described above, comprising an extension housing for bracing the longer power output shaft of the differential, in which, when said extension housing is removed from the differential, the oil seal which keeps lubricant oil in the differential is maintained.

According to the present invention, these and other objects are accomplished by, in a vehicle comprising two axially opposed driven wheels, a transmission comprising: (a) two drive shafts of equal length, each flexibly drivingly coupled at its outer end to one of said wheels; and (b) a differential axially located closer to a first one of said wheels and further from the other one of said wheels, comprising: (b1) a casing; (b2) a short power output shaft extending towards said first wheel and flexibly drivingly coupled at its outer end to the inner end of the one of said drive shafts whose outer end is drivingly connected to said first wheel; (b3) a long power output shaft extending towards said other wheel and flexibly drivingly coupled at its outer end to the inner end of the one of said drive shafts whose outer end is drivingly connected to said other wheel; (b4) a stiff tubular housing through which said long power output shaft passes, which is fixed at its inner end to said casing; and (b5) a bearing mounted in the outer end of said tubular housing and rotatably supporting an outer part of said long power output shaft.

By this arrangement, by the stiffness of said tubular housing, said differential casing supports via said bearing said outer part of said long power output shaft reliably and firmly, whereby it is practicable to form the two drive shafts which extend to the driven wheels to be of equal lengths, even though the differential is axially offset towards said first one of said driven wheels, thus providing good operational characteristics for said vehicle and preventing asymmetrical driving of said vehicle.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

FIG. 2 is a part sectional view of part of a first preferred embodiment of the transmission according to the present invention, showing a clutch housing, a gearbox, and an overdrive casing, showing in section a differential casing and the parts contained therein and the power output shafts and an extension housing of this differential, and also showing by phantom lines universal joints coupled to the outer ends of these power output shafts and parts of drive shafts extending outwards from these universal joints, this embodiment being distinguished by a cylindrical projecting engaging portion of said tubular housing which encloses the longer of the power output shafts of the differential being fitted into a mating receiving hole in the differential casing so as to mount said extension housing to said differential casing, and also by an oil seal being provided between the outer surface of the longer power output shaft and the inner end of this extension housing;

DESCRIPTION OF THE PREFERRED EMBODIMENTS

The present invention will now be described in terms of several preferred embodiments thereof, and with respect to the accompanying drawings.

Figure 1:
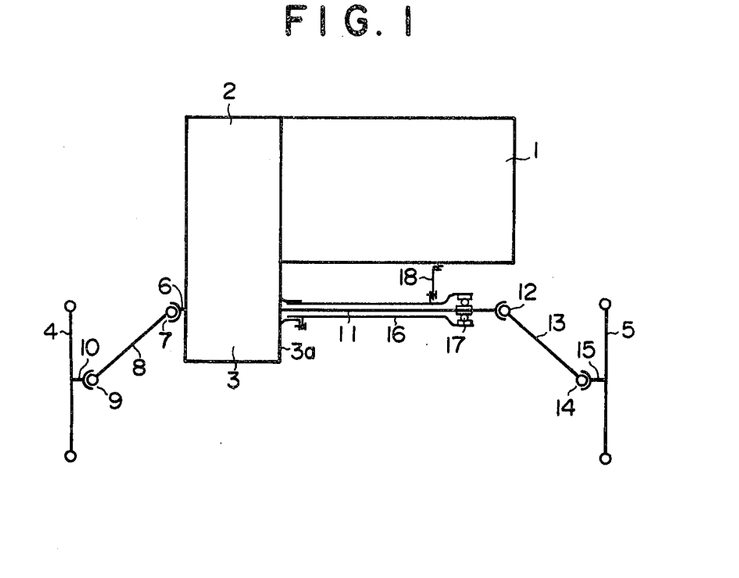
FIG. 1 is a schematic illustration, showing generally the constructions of the preferred embodiments of the transmission according to the present invention, in part block diagrammatical form.

In FIG. 1, there is shown in schematic form the general construction of all of the three preferred embodiments of the transmission according to the present invention which will be described. Referring to this figure, the reference numeral 1 denotes the transversely mounted engine of a vehicle, which transmits rotary power to a gearbox 2 fitted on to one side of said engine 1. The longitudinal axis of the vehicle runs perpendicular to the plane of the drawing paper in FIG. 1. Below the gearbox 2, and integral therewith, there is provided a differential device 3. To the left and to the right of the engine 1 and the gearbox 2, and somewhat below them, there are positioned left and right vehicle wheels 4 and 5, and accordingly it will be seen that the engine 1 and the gearbox 2 are transversely mounted above and between these left and right vehicle wheels 4 and 5. In fact, in the shown construction, the wheels 4 and 5 are the front wheels of the vehicle, and are steered, and accordingly this vehicle is of a transverse front engined front wheel drive type, i.e. a so called FF type.

The left hand vehicle wheel 4 is driven by a short stub axle 10 fitted on the inner side thereof, and, similarly, the right hand vehicle wheel 5 is driven by a short stub axle 15 mounted on the inner side thereof. These stub axles 10 and 15 are of equal lengths.

To the inner end of the left hand stub axle 10 there is coupled, via a fixed type constant velocity universal joint 9, the outer end of a left hand drive shaft 8 for driving the left hand vehicle wheel 4. Similarly, to the inner end of the right hand stub axle 15 there is coupled, via a fixed type constant velocity universal joint 14, the outer end of a right hand drive shaft 13 for driving the right hand vehicle wheel 5. These drive shafts 8 and 13 are of equal lengths.

From the differential 3 there extend a short left hand power output shaft 6 and a long right hand power output shaft 11. The outer end of the short left hand power output shaft 6 is coupled, via a slide type constant velocity universal joint 7, to the inner end of the left hand drive shaft 8, and, similarly, the outer end of the long right hand power output shaft 11 is coupled, via a slide type constant velocity universal joint 12, to the inner end of the right hand drive shaft 13. According to this construction, the excess in the length of the long right hand power output shaft 11, over the length of the short left hand power output shaft 6, compensates for the asymmetrical positioning of the differential 3 with respect to the driven wheels 4 and 5, so that according to this construction, as mentioned above, the left hand drive shaft 8 is of the same length as the right hand drive shaft 13, and the left and right hand drive shafts 8 and 13 extend downwards at the same down slope angles.

Particularly according to the present invention, a right hand portion of the long right hand power output shaft 11 extending to the right of the differential 3, i.e. an outer portion of said power output shaft 11 remote from the differential 3, is supported by the inner race of a ball bearing 17. The outer race of this ball bearing 17 is fitted in the outer or right hand end, remote from the differential 3, of an extension housing 16, which is constructed in a tubular form, and which encloses the major part of the power output shaft 11 within its interior tubular cavity. The left hand end or the inner end of this extension housing 16 is fixedly fitted to the outer casing 3a of the differential 3 so as to be rigidly supported thereby. Accordingly, therefore, by the rigidity of the parts, the outer or right hand end of the long power output shaft 11 is well rotatably supported, with respect to the differential 3, and is not able to lash about from side to side. The ball bearing 17 is provided with an oil seal construction, so as to prevent the escape of lubricant out therefrom.

In the shown embodiments, in fact, the outer or right hand end of the extension housing 16 is also resiliently connected, via a bracket 18, to the internal combustion engine 1 of the vehicle. This particular construction is not essential to the present invention, and may be dispensed with if the rigidity of the extension housing 16, and of the coupling of this extension housing 16 to the differential casing 3a, is sufficiently great to ensure that the outer race of the ball bearing 17 is properly held in place, so as to maintain the firm positioning of the right hand end or the outer end of the long power output shaft 11.

According to the above outlined construction, because the positional accuracy attained between the part of the casing 3a of the differential 3 and the inner or left hand end of the extension housing 16 can be controlled during manufacture of the parts, and therefore because the relative position of the differential 3 and of the ball bearing 17 which rotatably supports the outer or right hand part of the long power output shaft 11 can be thus controlled without any adjustment operation after manufacture, thereby this right hand end portion of the long power output shaft 11 may be reliably rotatably supported in a simple and easy fashion.

Now, in FIG. 2, the more concrete structure of a particular first preferred embodiment of the transmission according to the present invention will be described. The schematic drawing shown in FIG. 1 applies to this first preferred embodiment, and also applies to the two further preferred embodiments which will be described later. Further, parts in FIG. 2 which correspond to parts in FIG. 1 are designated by the same reference numerals and letters as are used in FIG. 1.

Figure 2:
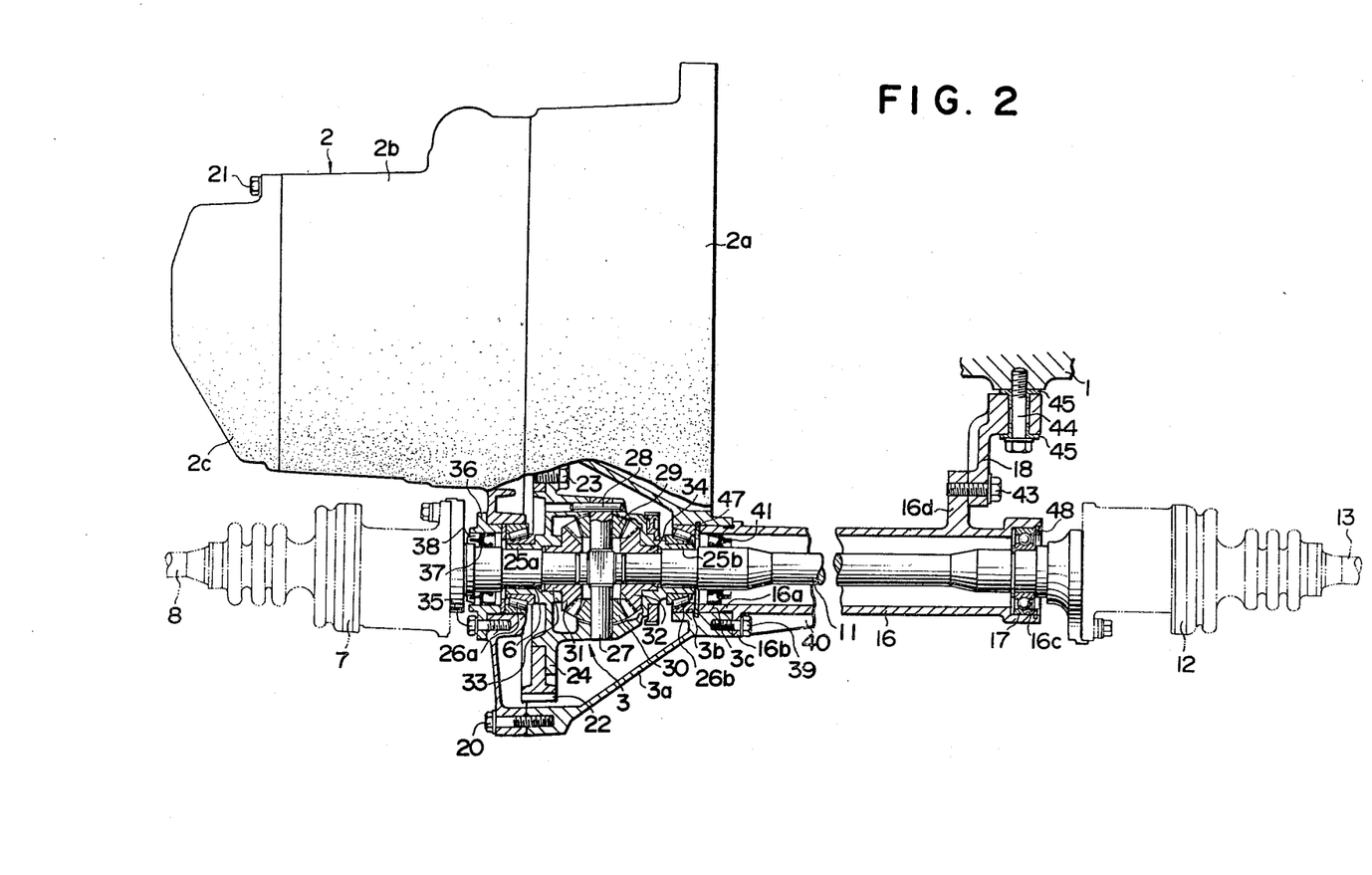

In FIG. 2, the gearbox casing which was generally designated in FIG. 1 by the reference numeral 2 is more particularly shown as comprising three casings: a clutch casing 2a, a gear casing 2b, and an overdrive gear casing 2c, which are abutted together in that order from the right to the left of FIG. 2. The clutch casing 2a is clamped to the gear casing 2b by a plurality of bolts 20, only one of which can be seen in the figure, and, similarly, the gear casing 2b is clamped to the overdrive gear casing 2c by a plurality of bolts 21, only one of which is shown in FIG. 2. The lower part of the clutch casing 2a, and also the lower part of the gear casing 2b, project downward, and these two lower parts cooperate to form the aforementioned differential casing 3a. This differential casing 3a, and the parts contained therein, but not any other parts such as for example gearbox parts, are shown in cross sectional view in FIG. 2 for the purposes of explanation.

Within the differential casing 3a there are mounted the outer races of two taper roller bearings 26a and 26b, respectively at the left and the right hand sides thereof. The right hand taper roller bearing 26b, in fact, is fitted in a bearing hole 3b, which opens to the outside of the differential casing 3a, as will be explained more fully later. The inner races of the ball bearings 26a and 26b support, respectively, hub portions 25a and 25b of a carrier or inner differential case 24. To the carrier 24 there is mounted a ring gear 22, via a plurality of bolts 23, only one of which can be seen in FIG. 2. This ring gear 22 is meshed with an output gear, not shown in the figures, of the gearbox 2, and accordingly rotary power is transmitted from the gearbox 2, via the ring gear 22, so as to rotate the carrier 24 within the differential casing 3a, in a per se well known fashion.

Within the carrier 24 there is, across an internal space thereof, fixedly mounted a pinion shaft 27 which extends transversely to the axis of rotation of the ring gear 22 and of the carrier 24, said pinion shaft 27 being fixed to the carrier 24 by a pin 28. On this pinion shaft 27 are freely rotatably supported two opposing bevel gears 29 and 30, each of which faces the other. Two side bevel gears 31 and 32 are suppoted by their respective hub portions 33 and 34 in a freely rotatably fashion within the carrier 24, and each of these side bevel gears 31 and 32 meshes with both of the bevel gears 29 and 30, again in a per se well known fashion. The axes of rotation of the side bevel gears 31 and 32 are the same as the axis of rotation of the ring gear 22 and of the carrier 24. Further, the side bevel gears 31 and 32 are pierced by central splined axial holes through their respective hub portions 33 and 34.

Coaxial left and right short and long power output shafts 6 and 11 are engaged, via the aforementioned spline portions, respectively with the hub portions 33 and 34 of the side bevel gears 31 and 32. In more detail, the output shaft 6, which is the left hand output shaft in FIG. 2, is the shorter, and this short power output shaft 6 is supported within the hub portion 25a of the carrier 24 so as to be freely rotatably therein, and extends leftwards through the differential casing 3a to project outwards therefrom. At its right hand end the short power output shaft 6 is splined to the aforementioned spline portions within the hub portion 33 of the side bevel gear 31, and at its left hand end the short power output shaft 6 is connected to the abovementioned universal joint 7, which is only shown by phantom lines in FIG. 2, via a flange portion. Around the part of the short power output shaft 6 which projects from the differential casing 3a there is mounted a cover member 36, which is fitted to the differential casing 3a by a plurality of bolts 35, only one of which can be seen in FIG. 2, and between this cover member 36 and the short power output shaft 6 there is fitted an annular oil seal 37. Further, around the outer portion of the short left hand power output shaft 6, there is fitted a cup shaped member or dust cover 38, which in cooperation with the lip portion of this oil seal 37 forms a good lubricant seal, in order to prevent escape of lubricant leftwards in the figure from the interior of the differential casing 3a, as well as also to prevent ingress of dust, dirt, or other undesirable contaminants thereinto.

On the other hand, on the right hand side of the differential casing 3a, there is located the longer right hand power output shaft 11. Similarly to the short left hand power output shaft 6, the end of the long right hand power output shaft 11 proximate to the differential 3, i.e. its inner end, is freely rotatably supported by the other hub portion 25b of the carrier 24, and is rotationally fixed, via splines and the abovementioned splined portion of the hub portion 34 of the side bevel gear 32, to this side bevel gear 32. On the other hand, the right hand end of the long right hand power output shaft 11, i.e. the end remote from the differential 3 or the outer end, is coupled to the aforementioned universal joint 12 (which is shown by phantom lines only in FIG. 2), via a flanged portion, and, as in the outline construction shown in FIG. 1, the other side of this universal joint 12 is connected to a drive shaft 13.

The differential housing 3a is formed with a fitting hole 3c coaxial with and extending from the bearing hole 3b in which the outer race of the aforementioned taper roller bearing 26b is fitted. A snap ring 47 is fitted within the bearing hole 3b, so as to retain said outer race of the taper roller bearing 26b therein and so as to prevent it from coming out therefrom. In the shown first embodiment of the transmission according to the present invention, in fact, the fitting hole 3c is of the same diameter as the bearing fitting hole 3b, and is a simple extension thereof; but this is not an essential feature of the transmission according to the present invention, although it is a convenient method of construction.

Into this fitting hole 3c there is engaged an engaging tubular portion 16a which is formed at the left hand end or the inner end of an extension housing 16. Thus, by the cylindrical cooperation of the inner surface of the fitting hole 3c and of the outer surface of the engaging tubular portion 16a of the extension housing 16, the central axis of the extension housing 16 is kept to be collinear with the central axis of the fitting hole 3c and thereby of the bearing hole 3b, and accordingly is kept to be collinear with the central axis of the carrier 24 and of the side bevel gear 32. The extension housing 16 is held to the differential casing 3a by means of a bolt 39 which is engaged into the differential casing 3a through a side lug flange portion 16b provided on the outer surface of the extension housing 16 near its end on which is formed the engaging portion 16a. In order to reinforce the extension housing 16, in the shown first preferred embodiment of the transmission according to the present invention, a rib 40 is formed along the outside of the left hand portion of the extension housing 16, i.e. along its laterally inner portion proximate to the differential casing 3a.

The long right hand power output shaft 11 passes along the central hole of the tubular extension housing 16 so as to project from the right hand end thereof, remote from the differential 3. An annular oil seal 41 is fitted around the long power output shaft 11, between its outer surface and the inner cylindrical surface of the tubular extension housing 16, at the end of the tubular extension housing 16 proximate to the differential 3. At the other or outer end of the tubular extension housing 16 there is coaxially formed a cylindrical bearing hole 16c, and the outer race of a sealed ball bearing 17 is fitted into this bearing surface 16c and is retained therein by a snap ring 48. The inner race of the sealed ball bearing 17 fits tightly around a right hand portion of the long power output shaft 11, so as to support it. The bearing hole 16c is arranged to be coaxial with the engaging tube cylindrical portion 16a, and, accordingly, when the engaging tubular portion 16a of the extension housing 16 is inserted into the engaging hole 3c formed in the differential casing 3a, thereby the central axis of the inner race of the ball bearing 17 is held to be coaxial with the axis of the bearing hole 3c and thus with the axis of the side bevel gear 32. Accordingly, since an outer part of the long right hand power output shaft 11 is tightly fitted in the inner race of the ball bearing 17, provided that as described above the axis of the cylindrical engaging portion 16a of the extension housing 16 is coincident with the axis of the engaging hole 3c formed in the differential casing 3a, thereby the axis of the long right hand power output shaft 11 will be desirably held coincident with the axis of the right hand side bevel gear 32.

Although it is not essential to the concept of the present invention, in fact in this shown first preferred embodiment of the transmission according to the present invention there is formed a fitting lug 16d on the outside surface of the extension housing 16, near its outer end remote from the differential casing 3a. To this fitting lug 16d there is fixed, via a fixing bolt 43, the one end of a bracket 18, and the other end of this bracket 18 is connected, via a fixing bolt 44 and an anti vibration rubber element 45, to the casing of the internal combustion engine 1 of the vehicle to which this transmission is fitted. This construction is provided so as to give additional stability to the positioning of the right hand end of the extension housing 16, and may be omitted without detriment to the principles or operation of the transmission according to the present invention, if the fixing of this extension housing 16 to the differential casing 3a is sufficiently strong and firm. The anti vibration rubber element 45 is provided in order to prevent transmission of engine vibrations or the like from the casing of the internal combustion engine 1 through the fitting bracket 18 to the extension housing 16 and therefrom to the long power output shaft 11.

According to the above outlined construction, in order for the central axis of the long power output shaft 11 to be reliably held coaxial with the central axis of the side bevel gear 32, it is necessary for the outer surface of the engaging tubular portion 16a of the extension housing 16 to be machined to be accurately coaxial with the inner surface of the bearing hole 16c of the extension housing 16; but this is not difficult, since the manufacture of the extension housing 16 can be achieved relatively easily and with high precision using a rotary machine tool such as a lathe or cylindrical grinder. Further, it is necessary for the outer surface of the tubular engaging portion 16a of the extension housing 16 to fit precisely together with the inner surface of the engaging hole 3c formed in the differential casing 3a; but, again, the precise manufacturing of such metallic forms as this presents no substantial difficulty. Since the extension housing 16 which encloses the length of the long power output shaft 11 and which supports the ball bearing 17 is provided as constructed independently from the differential casing 3a, the differential casing 3a need only be manufactured in a slightly modified form, as compared to one of conventional pattern in which no extension housing such as the extension housing 16 is to be joined thereto.

Thus, according to such a construction, it is seen that it is practicable for the differential to be asymmetrically placed between and with respect to the driven wheels of the vehicle, closer to one of these driven wheels than to the other, while preserving the operational characteristics of the vehicle, and while allowing the downwardly sloping drive shafts such as the drive shafts 8 and 13 shown in FIG. 1, to be of the same length, via a simple and rigid construction for the extension housing 16. Further, in this case there is no need to provide any undue number of universal joints in the power train from the differential to the driven wheel furthest away from it, and thus undue slack in the transmission is prevented. Further, the weight of the transmission, and the manufacturing complexity and cost thereof, are minimized.

Yet further, high dimensional accuracy for the various parts of the transmission during manufacture is not particularly required, according to the shown construction, nor is any adjustment after the manufacturing process and during the assembly of the transmission required, which is a great advantage.

According to the shown first preferred embodiment of the transmission according to the present invention, since the extension housing 16 is formed quite separately from the differential casing 3a, this extension housing 16 may be removed together with the long power output shaft 11 from the differential 3. Thus, it is possible to fit an oil seal, such as the oil seal 41, between the power output shaft 11 and the extension housing 16, near the fitting end of the extension housing 16; and, when both the extension housing 16 and the long power output shaft 11 are removed together from the differential 3, this oil seal 41 need not be disturbed. According to this construction, it is not necessary for the interior of the extension housing 16 to be oil filled; and in this case the lubrication of the ball bearing 17 may be provided separately, and the ball bearing 17 may be a sealed ball bearing. In this case, the amount of oil required to be provided within the differential 3 may be reduced, as compared with the alternative wherein a long extension housing such as the extension housing 16 requires to be filled with oil or with oil mist; and accordingly because the lateral dimension of the oil filled space within the differential 3 is substantially reduced, fluctuations of the oil level of the oil filled within the differential 3, as the vehicle goes around left or right hand corners and centrifugal force acts upon this oil, may be advantageously reduced. Thereby, the efficiency and reliability of lubrication of the various transmission parts of the differential 3 may be improved.

Figure 3:
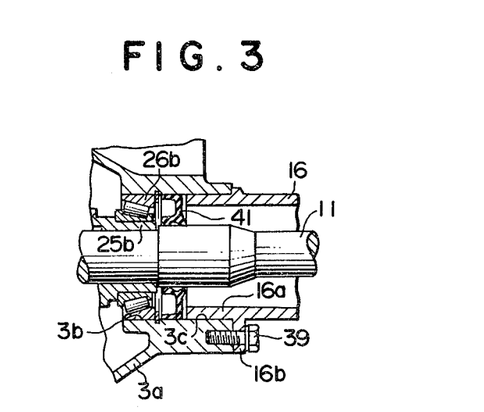
FIG. 3 is a partial sectional view of part of a second preferred embodiment of the transmission according to the present invention, similar to part of FIG. 2, said second preferred embodiment differing from the first preferred embodiment shown in FIG. 2 by said oil seal being fitted between the outer surface of the longer power output shaft of the differential and the casing of the differential.

In FIG. 3, there is shown a fragmentary sectional view of the parts of a second preferred embodiment of the transmission according to the present invention which differ from the parts of the first embodiment shown in FIG. 2. In FIG. 3, parts which correspond to parts of the first embodiment shown in FIGS. 1 and 2, and which have the same functions, are designated by the same reference numerals as in those figures; and the generalized schematic view shown in FIG. 1 applies to this second preferred embodiment, as well as to the first embodiment shown in FIG. 2.

In this second preferred embodiment, the oil seal 41 is not fitted between the inner wall of the extension housing 16 and the outer surface of the long power output shaft 11, but is instead fitted between the inner surface of the engaging hole 3c formed in the differential casing 3a, and the outer surface of the long power output shaft 11. Thus, in this second preferred embodiment, even when the extension housing 16 is detached from the differential casing 3a and is removed therefrom, leaving the long power output shaft 11 in place, the sealing effect of the oil seal 41 is preserved, and accordingly there is no escape of oil from the differential casing 3a. On the other hand, if the extension housing 16 is detached together with the long power output shaft 11, then this sealing effect is not preserved.

Figure 4:
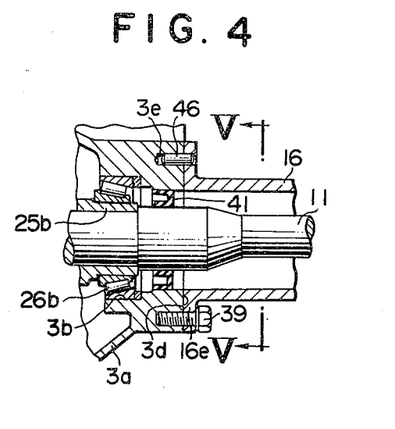
FIG. 4 is a part sectional view of part of a third preferred embodiment of the transmission according to the present invention, similar to FIG. 3, in which third preferred embodiment the tubular housing is fitted to the casing of the differential not by insertion of a cylindrical projecting engaging portion thereof into a mating receiving hole in the differential casing, but by a flat face of said tubular housing being clamped against another flat face formed upon the differential casing, by means of fixing bolts and locating knock pins.

In FIG. 4, there are again shown in partial sectional view the essential parts of a third preferred embodiment of the transmission according to the present invention, which differs from the first preferred embodiment shown in FIGS. 1 and 2, only in the parts which are illustrated. Again, the parts in this third preferred embodiment which correspond to parts of the first and second preferred embodiments shown in FIGS. 1 through 3, and which have the same functions, are designated by the same reference numerals as in those figures. The generalized schematic view shown in FIG. 1 is applicable to this third preferred embodiment, also. Further, in FIG. 5 a sectional view through the parts shown in FIG. 4 along a plane shown by the lines V—V in FIG. 4 is presented.

Figure 5:
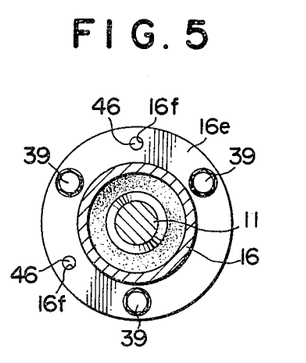
FIG. 5 is a sectional view through the third preferred embodiment of the transmission according to the present invention shown in FIG. 4, taken along a plane shown by the lines V—V in FIG. 4.

In this third preferred embodiment, as in the second preferred embodiment shown in FIG. 3, the oil seal 41 is fitted between the exterior surface of the long power output shaft 11 and the internal surface of the fitting hole 3c formed within the differential housing 3a, but, in contradistinction to the case with the two previous preferred embodiments, the extension housing 16 is not formed with any projecting cylindrical fitting portion such as the fitting portion 16a in the previous two embodiments, but the left hand end of the extension housing 16 is instead formed as a flattened fitting flange portion 16e, through which there are bored a plurality of holes, through which are passed a plurality of fitting bolts 39, which thus clamp the extension housing 16 to a flattened fitting surface 3d formed on the outer surface of the differential casing 3a. Further, in this third preferred embodiment, two knock pin holes 16f are formed in the flange portion 16e, and two corresponding knock pin holes 3e are formed in said fitting surface 3d formed on the outside of the differential casing 3a. Two knock pins 46 are fitted in and between these knock pin holes 3e and 16f, and thus these knock pins 46 maintain these knock pin holes 3e and 16f in alignment. By this aligning construction, accordingly, the central axis of the extension housing 16 and of the sealed ball bearing 17 mounted therein is arranged to be collinear with the central axis of the right hand side bevel gear 32, and accordingly the axis of the long power output shaft 11 is kept collinear with the axis of this right hand side bevel gear 32.

Thus, with respect to the above described second and third preferred embodiments of the transmission according to the present invention, as well as with respect to the first, it is seen that the construction allows for the differential 3 to be asymmetrically placed between the driven wheels of the vehicle, closer to one than to the other, while preserving substantially symmetrical driving characteristics of the vehicle, by allowing the downwardly sloping drive shafts 8 and 13 to be of the same length and to be angled downwards through the same angle. Accordingly, the same beneficial effects and results are obtained as with the first preferred embodiment of the transmission according to the present invention shown in FIGS. 1 and 2.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

We claim:

1. In a vehicle comprising two axially opposed driven wheels, a transmission comprising:
   (a) two drive shafts of equal length, each flexibly drivingly coupled at its outer end to one of said wheels; and
   (b) a differential axially located closer to a first one of said wheels and further from the other one of said wheels, comprising:
      (b1) a casing;
      (b2) a short power output shaft extending towards said first wheel and flexibly drivingly coupled at its outer end to the inner end of the one of said drive shafts whose outer end is drivingly connected to said first wheel;
      (b3) a long power output shaft extending towards said other wheel and flexibly drivingly coupled at its outer end to the inner end of the one of said drive shafts whose outer end is drivingly connected to said other wheel;
      (b4) a stiff tubular housing through which said long power output shaft passes, which is fixed at its inner end to said casing; and
      (b5) a bearing mounted in the outer end of said tubular housing and rotatably supporting an outer part of said long power output shaft;
      (b6) said casing being formed with a cylindrical receiving aperture, and said tubular housing being formed with a cylindrical end portion which mates into said cylindrical receiving aperture and fixes said tubular housing to said casing in a fixed orientation; said differential further comprising a carrier and a carrier bearing which rotationally supports said carrier about a rotational axis collinear with the rotational axis of said long power output shaft, said casing being formed with a bearing hole which supports said carrier bearing, and said cylindrical receiving aperture being formed as a direct continuation of said bearing hole and being coaxial with said bearing hole.

2. A transmission according to claim 1, wherein said casing is formed with a plane first mating surface, and wherein the end of said tubular housing proximate to said casing is formed with a plane second mating surface; and further comprising a plurality of knock pins, said casing being formed with a plurality of first knock pin holes opening into said first mating surface, and said tubular housing being formed with a plurality of second knock pin holes opening into said second mating surface, said knock pins being fitted into said first knock pin holes and also into said second knock pin holes.

3. A transmission according to claim 1, further comprising a fixing bolt which clamps together said tubular housing and said casing.

4. A transmission according to claim 1, further comprising a fixing bolt which clamps together said tubular housing and said casing.

5. A transmission according to claim 2, further comprising a fixing bolt which clamps together said tubular housing and said casing.

6. A transmission according to any preceding claim, further comprising a toroidal oil seal, the inner surface of said toroidal oil seal fitting around the outer cylindrical surface of said long power output shaft so as to form an oil seal therebetween, said toroidal oil seal preventing the passage of oil to the space between said long power output shaft and said tubular housing on the side of said toroidal oil seal away from said differential.

7. A transmission according to claim 6, wherein the outer surface of said toroidal oil seal fits against the inner surface of said tubular housing at a part thereof proximate to the end of said tubular housing which is fixed to said casing.

8. A transmission according to claim 7, wherein the outer surface of said toroidal oil seal mates against said casing.

9. In a vehicle comprising two axially opposed driven wheels, a transmission comprising:
   (a) two drive shafts of equal length, each flexibly drivingly coupled at its outer end to one of said wheels; and
   (b) a differential axially located closer to a first one of said wheels and further from the other one of said wheels, comprising:
   (b1) a casing formed with a first and a second cylindrical receiving aperture axially aligned with one another;
   (b2) a short power output shaft extending towards said first wheel and flexibly drivingly coupled at its outer end to the inner end of the one of said drive shafts whose outer end is drivingly connected to said first wheel;
   (b3) a long power output shaft extending towards said other wheel and flexibly drivingly coupled at its outer end to the inner end of the one of said drive shafts whose outer end is drivingly connected to said other wheel;
   (b4) a separate stiff tubular housing through which said long power output shaft passes, which is formed with a cylindrical outer surface at an inner end portion thereof which mates into said first cylindrical receiving aperture to be fixed at its inner end to said casing and a cylindrical inner surface at an outer end portion thereof opposite to said inner end portion;
   (b5) a bearing fitted into said cylindrical inner surface of said outer end portion of said tubular housing and rotatably supporting an outer end portion of said long power output shaft; and
   (b6) a carrier and a carrier bearing which rotatably supports said carrier and an inner end portion of said long power output shaft and mates into said second cylindrical receiving aperture.

10. A transmission according to claim 9, where said first and said second cylindrical receiving aperture have the same diameter as one another.

11. A transmission according to claim 9, further comprising a fixing bolt which clamps together said tubular housing and said casing.

12. A transmission according to claim 9, further comprising a toroidal oil seal provided between the inner surface of said tubular housing and the outer surface of said long power output shaft, said toroidal oil seal preventing the passage of oil to the space between said long power output shaft and said tubular housing on the side of said toroidal oil seal away from said differential.

* * * * *